United States Patent [19]  [11] Patent Number: 4,823,602
Christensen, Jr.  [45] Date of Patent: Apr. 25, 1989

[54] ACCELEROMETER MOUNTING DEVICE

[75] Inventor: Able B. Christensen, Jr., Danbury, Tex.

[73] Assignee: The Dow Chemical Company, Midland, Mich.

[21] Appl. No.: 64,262

[22] Filed: Jun. 19, 1987

[51] Int. Cl.⁴ .............................................. G01H 11/06
[52] U.S. Cl. ....................................... 73/661; 73/866.5
[58] Field of Search ................. 73/654, 652, 649, 493, 73/517 R, 35, 431, 660, 661, 866.5; 310/329; 248/637, DIG. 4

[56] References Cited

U.S. PATENT DOCUMENTS

| 3,104,335 | 9/1963 | Shoor | 73/654 |
| 3,487,238 | 12/1969 | Angleton et al. | 310/329 |
| 3,673,442 | 6/1972 | Sonderegger | 310/329 |
| 4,502,332 | 3/1985 | Sheridan et al. | 73/661 |
| 4,637,246 | 1/1987 | Lombard et al. | 310/329 |
| 4,704,894 | 11/1987 | Inuzuka et al. | 310/329 |

Primary Examiner—John Chapman
Attorney, Agent, or Firm—Joe R. Prieto

[57] ABSTRACT

A device for mounting an accelerometer thereon including a base plate with an annular portion integral with the plate on one side and an elongated portion integral with the plate on the other side. The elongated portion mounts to an apparatus such as a motor or pump and the annular portion attaches to a housing member such as a conduit for enclosing the accelerometer. The base plate contains a threaded opening for receiving a threaded stud attached to an accelerometer. The accelerometer is enclosed from the environment and protected from corrosive elements or weather conditions.

15 Claims, 2 Drawing Sheets

ACCELEROMETER MOUNTING DEVICE

BACKGROUND OF THE INVENTION

This invention relates to a mounting device for an accelerometer, and more particularly, to an adaptor for mounting the accelerometer thereto and connecting the adaptor to a housing for enclosing the accelerometer.

An accelerometer is a transducer which produces an electrical signal proportional to the level of acceleration to which it is subjected. The accelerometer is used for measuring vibration of, for example, industrial equipment, such as pumps or motors, for incipient failure detection and to facilitate diagnostic machinery analysis. There are several commercially available accelerometer designs, one of which is the piezoelectric accelerometer. A piezoelectric accelerometer is an electromechanical transducer that generates an electrical output when subjected to vibration. The electrical output will be directly proportional to the acceleration of the accelerometer base, over a limited frequency range and dynamic range. Piezoelectric accelerometers contain a piezoceramic sensing element attached between the mounting surface of the accelerometer and an inertial mass. The piezoceramic material has the property of producing an electrical signal proportional to its mechanical deformation, within the elastic limits of the material. This deformation is caused by the inertial force of the mass which is attached to the ceramic. This mass tends to remain at its existing level of motion when a changing acceleration is applied to the mounting surface of the accelerometer and thus a net instantaneous force appears across the crystal.

When exposed to a corrosive environment, the accelerometer not only corrodes but loses its precision in its sensing capabilities in a short period of time. In order to protect the accelerometer from the environment and the elements and still allow the accelerometer to function according to its original specifications, a novel adaptor for mounting the accelerometer and a housing member thereto has been developed.

SUMMARY OF THE INVENTION

The present invention is directed to an accelerometer mounting device including a base plate with a first and second side and an opening centrally disposed therein; an annular portion sealably attached to the first side of the base plate and adapted for attaching a housing member to the accelerometer; an elongated portion sealably attached to the second side of the base plate; said elongated portion comprising a tubular portion sealably connected at one end to the opening of the base plate and sealed at the other end, said tubular portion having threads on the outer surface thereof adapted for threadingly engaging a threaded bore of an apparatus for sensing vibrations with the accelerometer, said tubular portion having threads on the inner surface thereof adapted for threadingly receiving a threaded rod, said rod being adapted for connecting to the accelerometer; and a raised portion annularly disposed around the base of the tubular portion and centrally disposed on the second side of the plate.

BRIEF DESCRIPTION OF THE DRAWINGS

The invention will be better understood by reference to the figures wherein the preferred embodiments of the present invention are illustrated, wherein like reference numerals refer to like parts in the different figures and wherein.

DETAILED DESCRIPTION OF THE PREFERRED EMBODIMENTS

Figure 1:
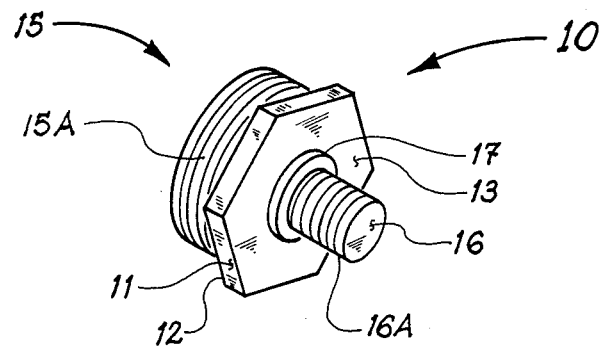
FIG. 1 is a perspective view showing the adaptor of the present invention.
Figure 2:
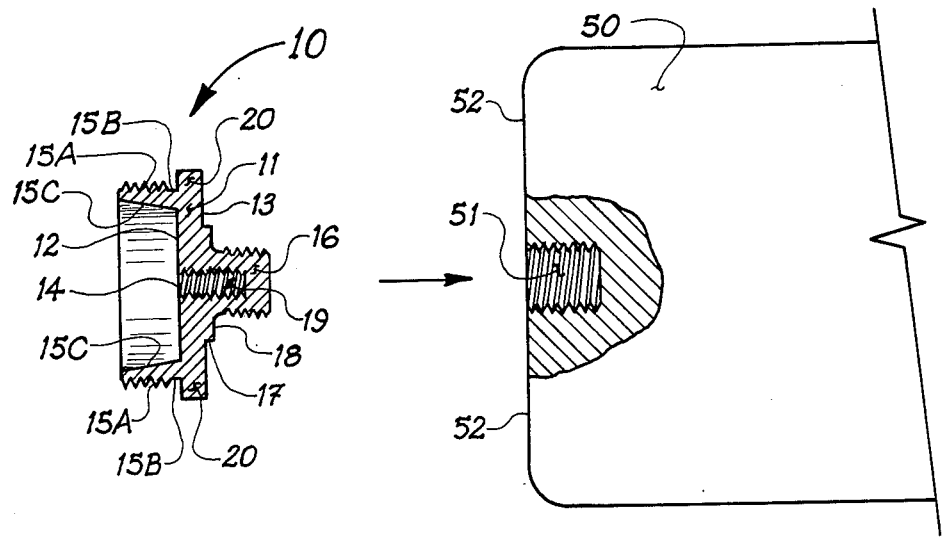
FIG. 2 is a cross section view of the adaptor of FIG. 1 and an exploded view showing where the adaptor would be mounted on another apparatus.
Figure 3:
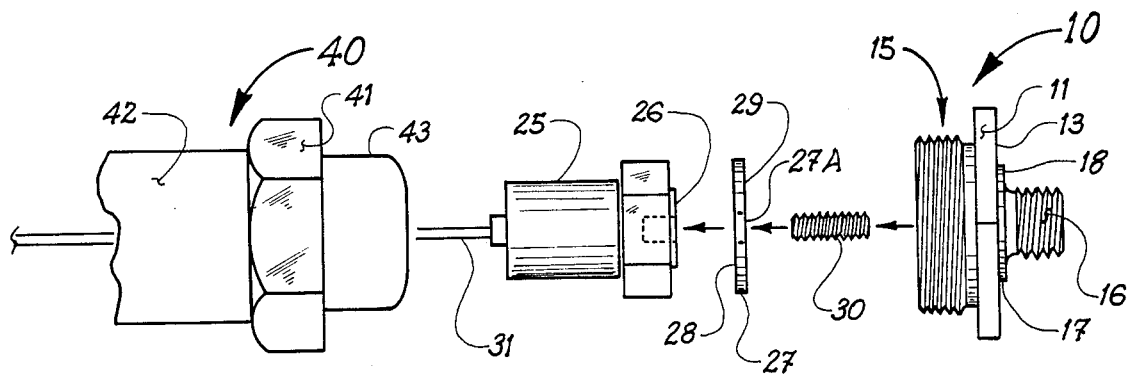
FIG. 3 is a side view, exploded view showing an accelerometer, an adaptor and cover member assembly.

With reference to FIGS. 1, 2 and 3, there is shown an adaptor of the present invention, generally indicated by numeral 10, adapted for having an accelerometer 25 (shown in FIG. 3) and a housing member 40 (shown in FIG. 3) mounted thereto. In the preferred embodiment, the adaptor, accelerometer and housing member are generally cylindrical in shape. Other shapes viewed in cross section, such as square or triangular, are also possible. The adaptor 10 includes a base plate 11 with a first and second side, 12 and 13, respectively. The base plate 11 also contains an opening 14 therethrough centrally disposed therein. The opening 14 is preferably threaded for receiving an electrically isolating threaded connecting rod 30 (shown in FIG. 3).

Integrally attached to the first side 12 of the base plate 11 is an annular portion indicated generally by numeral 15, adapted for removably attaching to the housing member 40. The annular portion 15 contains an outer threaded surface 15a for threadingly engaging the connector means 41 of the housing member 40. The housing member 40 comprises a connector 41, such as a nut, and a conduit 42 with an extending portion 43 such as a ferrule. The connector means 41, in this instance, is of the female type. It is preferred that the annular portion 15 also have a non-threaded surface 15b for the nut 41 (shown in FIG. 3) to fit snugly around the surface of the annular portion 15. Preferably, the inside diameter of the annular portion 15 contains a slight taper 15c increasing in thickness from one end of the annular portion 15 toward the center of the base plate 11. The tapered surface 15c provides a mating surface for the extending portion 43, for a snug fit and sealing fit.

The second side 13 of the base plate 11 contains an elongated portion, in this instance a tubular portion 16, centrally disposed on the plate 11 with a threaded outer surface 16a for threadingly engaging and removably engaging a threaded blind bore 51 on a desired part of an apparatus 50, for example, a pump, a motor, gear box, fan, turbine or a generator which is desired to measure its vibration and obtain vibration data thereof. The second side 13 of the base plate 11 also contains a raised annular portion 17 around the base of the tubular portion 16 and centrally disposed on the plate 11. The raised portion 17 provides a mating surface 18 for contacting the mating surface 52 of the apparatus 50. The bore 51 is located on a part of the equipment which provides the required contact between the mating surface 18 and the mating surface 52 of the equipment 50. The raised portion 17, preferably, has a diameter substantially equal to the diameter of the mating surface 26 of the accelerometer 25. The raised portion 17 allows the transfer of high frequency vibration without substantial attenuation through the adapator walls and material. It is preferred that the mating surface 18 and the surface of the first side 12 be machined or ground to a surface finish of at least 30 RMS, for example, by commonly known machining or grinding techniques to minimize attenuation of the high vibration on frequencies transmitted therethrough.

The elongated portion 16 contains a blind bore 19 centrally disposed therein with the bore opening aligned axially to and integrally with the central opening 14 of the base plate 11. The bore 19 is preferably threaded for receiving the threaded stud 30 for connecting the accelerometer 25 to the adaptor 10. In FIG. 3, an electrically isolating washer 27 is shown disposed between the accelerometer mating surface 26 and first side 12 of the base plate 11. The threaded stud 30 is passed through the central opening 27a of washer 27 and fits snugly into the bore 19 with the mating surface 26 of the accelerometer contacting the first side 28 of the washer 27 and the first side 12 of the base plate 11 contacting the second side 29 of the washer within the annular portion 15. While in FIG. 3 the washer 27 and rod 30 are shown as separate components another embodiment would be to manufacture these components as part of the accelerometer 25. The washer 27 and rod 30 are used for electrically isolating the accelerometer from the adaptor to provide accurate frequency response from the accelerometer.

In operation, the vibrations of the equipment 50 pass from mating surface 52 to the raised portion 17 of the second side 13 of the adaptor 10 through the wall of the base plate 11 to the first side 12 of the base plate 11 and then to the mating surface 26 of the accelerometer wherein the vibration is sensed by the operating mechanism of the accelerometer 25. The electronic output of the accelerometer is sent through an output connector or integral cable 31 to a vibration monitoring device and/or data recording device (not shown).

In FIG. 1-3, the base plate 11 extends a predetermined distance beyond the periphery of the annular portion 15 to form a flange portion 20. The flange portion 20 serves to provide a surface for fitting a tool, for example, a conventional wrench, for mechanically rotating the adaptor 10 to thread the adaptor into a connector 40. in this instance, the flange portion 20 is hexagonal in shape as shown in FIG. 1. The flange portion 20 is a preferred embodiment of the present invention but is not required as shown in another embodiment in FIGS. 4 and 5. Alternatively, the base plate 11 may be circular in shape, as shown in FIG. 6.

Figure 4:
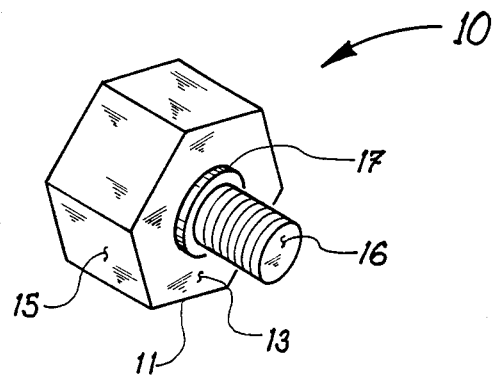
FIG. 4 is a perspective view showing another adaptor of the present invention.
Figure 5:
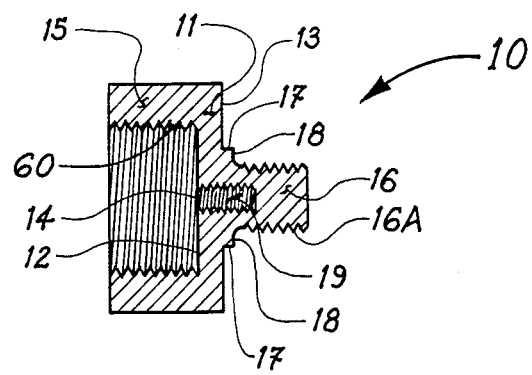
FIG. 5 is a cross section view of the adaptor of FIG. 4.
Figure 6:
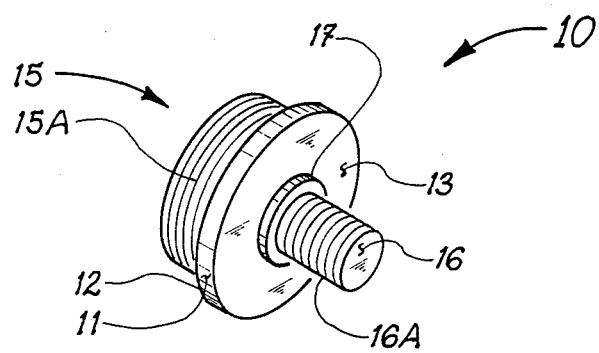
FIG. 6 is a perspective view showing another adaptor of the present invention.

With reference to FIGS. 4 and 5, the base plate 11 is integral with the annular portion 15. In this embodiment, the annular portion 15 is preferably six-sided (hexagonal) with each surface of each side being planar and smooth. The base plate 11 also is preferably a hexagonal plate contiguously attached to the annular portion 15. In this instance, a flange portion is not necessary because a fitting tool such as a conventional wrench can fit around the periphery of the annular portion 15 or around the periphery of the base plate 11 for rotating the device on a connector means (not shown). The annular portion 15 contains a threaded internal surface 60 for threadingly engaging a connector means (not shown) such as a male-type threaded connector.

Again, referring to FIG. 3, the adaptor 10 described herein is used for mounting an accelerometer 25 thereto and then a housing member 40, such as a nut 41 and conduit 42, is mounted on the adaptor 10 over the accelerometer to keep the accelerometer enclosed and isolated from a corrosive environment, the atmosphere and weather conditions. The enclosure assembly comprising the adaptor 10 and the housing member 40 protects the accelerometer 25 and allows the accelerometer to function as designed particularly when used in corrosive environments. For example, the conduit may be made of non-corrosive materials such as liquid tight non-metallic flexible conduit or liquid tight metallic flexible conduit. In addition, commercially available explosion proof enclosures, flexible couplings, and the like, may be used for Division I locations. Preferably, the adaptor can also be made of corrosion resistant materials such as various stainless steels, Inconel-monel, and the like or non-metallic materials such as glass filled fluorocarbons, polycarbonate, nylon, and the like. Most metallic materials are preferred because the frequency response is higher than for non-metallic materials, which is of concern only in frequencies near 3000 Hz and above. Corrosive environments which come into contact with the adaptor 10, wherein the adaptor 10 can be used include for example, an environment containing inorganic chloride, acids, acid gases, organic solvents, sulfur compounds, rain, dew and sea water. The mounting device should have male or female conduit threads that are suitable for hazardous area service.

The accelerometer attached to the adaptor with the novel construction of the present invention will function as designed without interference of the adaptor's structure with the accelerometers normal operation. In addition, the accelerometer is not exposed to the elements of weather or to chemicals in the air which can affect its performance and function. With time an accelerometer exposed to a corrosive and/or wet environment will give inaccurate readings and non-precision data. the novel construction of the adaptor also provides intimate surface to surface contact between the adaptor and the sensing surface portion of the accelerometer with the surfaces of the piece of equipment being monitored to provide precision response by the accelerometer.

After reading the above specification and claims, modifications of the present invention will become apparent to one skilled in the art pertaining to the present invention.

What is claimed is:

1. An adaptor for removably mounting an accelerometer thereto, said accelerometer having a first housing member , said first housing member enclosing the accelerometer, said first housing member containing a first mating surface, said adaptor comprising:

a base plate with a first and second side and an opening centrally disposed therein; said first side adapted for contacting the first mating surface of the first housing of the accelerometer;

an annular portion sealably attached to the first side of the base plate and adapted for removably attaching a second housing member thereto for enclosing the accelerometer and the first housing member with the first mating surface;

an elongated portion sealably attached to the second side of the base plate; said elongated portion comprising a tubular portion sealably connected at one end to the opening of the base plate and sealed at the other end, said tubular portion having threads on the outer surface thereof adapted for threadingly engaging a threaded bore disposed in an apparatus of interest to be monitored for vibrations with the accelerometer, said tubular portion having threads on the inner surface thereof adapted for threadingly receiving a threaded rod, said rod adapted for connecting the accelerometer and the first housing member with the first mating surface to the adaptor; and a raised portion providing a mating surface for contacting the apparatus of interest and transferring vibration through the base plate wall without substantial attenuation through the adaptor walls to the first mating surface of the first housing of the accelerometer whereby vibration is sensed by the accelerometer, said raised portion annularly disposed around the base of the tubular portion and centrally disposed on the second side of the plate.

2. The adaptor of claim 1 including a flange portion annularly disposed around the perimeter of the base plate.

3. The adaptor of claim 2 wherein the flange is hexagonal in shape.

4. The adaptor of claim 1 wherein the base plate is circular in shape.

5. The adaptor of claim 1 wherein the annular portion has an outer threaded surface.

6. The adaptor of claim 5 wherein the second housing member is a conduit.

7. The adaptor of claim 1 wherein the annular portion has a hexagonal shape and the base plate is integral therewith with a hexagonal shape.

8. The adaptor of claim 7 wherein the annular portion has a threaded internal surface.

9. The adaptor of claim 8 wherein the second housing member is a conduit.

10. The adaptor of claim 1 wherein the raised portion has a diameter substantially equal to the diameter of the first mating surface of the accelerometer.

11. An assembly comprising:
(a) an accelerometer with a first housing member, said first housing member enclosing the accelerometer, said first housing containing a mating surface
(b) an adaptor for removably mounting the accelerometer and the first housing member with the first mating surface thereto, said adaptor including
(i) a base plate with a first and second side and an opening centrally disposed therein; said first side adapted for contacting the first mating surface of the first housing of the accelerometer;
(ii) an annular portion sealably attached to the first side of the base plate and adapted for removably attaching a second housing member thereto for enclosing the accelerometer and the first housing member with the first mating surface;
(iii) an elongated portion sealably attached to the second side of the base plate; said elongated portion comprising a tubular portion sealably connected at one end to the opening of the base plate and sealed at the other end, said tubular portion having threads on the outer surface thereof adapted for threadingly engaging a threaded bore disposed in an apparatus of interest to be monitored for vibrations with the accelerometer, said tubular portion having threads on the inner surface thereof adapted for threadingly receiving a threaded rod, said rod adapted for connecting the accelerometer and the first housing member with the first mating surface to the adaptor; and
(iv) a raised portion providing a mating surface for contacting the apparatus of interest and transferring vibration through the base plate wall without substantial attenuation through the adaptor walls to the first mating surface of the first housing of the accelerometer whereby vibration is sensed by the accelerometer, said raised portion annularly disposed around the base of the tubular portion and centrally disposed on the second side of the plate; and (c) a second housing member releasably attached to the adaptor, said second housing member and adaptor in combination adapted for enclosing said accelerometer and the first housing member with the first mating surface.

12. The assembly of claim 11 wherein the second housing member is a conduit.

13. The assembly of claim 11 wherein the raised portion has a diameter substantially equal to the diameter of the first mating surface of the accelerometer.

14. In an accelerometer for monitoring vibration of an apparatus of interest, the accelerometer having a first housing member, said first housing member enclosing the accelerometer, said first housing member containing a first mating surface, the improvement which comprises a second housing member with a second mating surface for enclosing the accelerometer and the first housing member, said second housing member comprising:
(a) an adaptor for removably mounting an accelerometer thereto, said adaptor including
a base plate with a first and second side and an opening centrally disposed therein; said first side adapted for contacting the first mating surface of the first housing of the accelerometer;
an annular portion sealably attached to the first side of the base plate and adapted for removably attaching a housing means thereto for enclosing the accelerometer and the first housing member with the first mating surface;
an elongated portion sealably attached to the second side of the base plate; said elongated portion comprising a tubular portion sealably connected at one end to the opening of the base plate and sealed at the other end, said tubular portion having threads on the outer surface thereof adapted for threadingly engaging a threaded bore disposed in an apparatus of interest to be monitored for vibrations with the accelerometer, said tubular portion having threads on the inner surface thereof adapted for threadingly receiving a threaded rod, said rod adapted for connecting the accelerometer and the first housing member with the first mating surface to the adaptor;
a raised portion providing a second mating surface for contacting the apparatus of interest and transferring vibration through the base plate wall without substantial attenuation through the adaptor walls to the first mating surface of the first housing of the accelerometer whereby vibration is sensed by the accelerometer, said raised portion annularly disposed around the base of the tubular portion and centrally disposed on the second side of the plate; and (b) a housing means releasably attached to the adaptor, whereby said housing means and adaptor in combination provides the second housing for said accelerometer.

15. The accelerometer of claim 14 wherein the raised portion has a diameter substantially equal to the diameter of the first mating surface of the accelerometer.

* * * * *